C. BROWN.
HEADLIGHT.
APPLICATION FILED NOV. 29, 1913.

1,110,877.

Patented Sept. 15, 1914.
2 SHEETS—SHEET 1.

Witnesses

Inventor
C. Brown,
By Victor J. Evans
Attorney

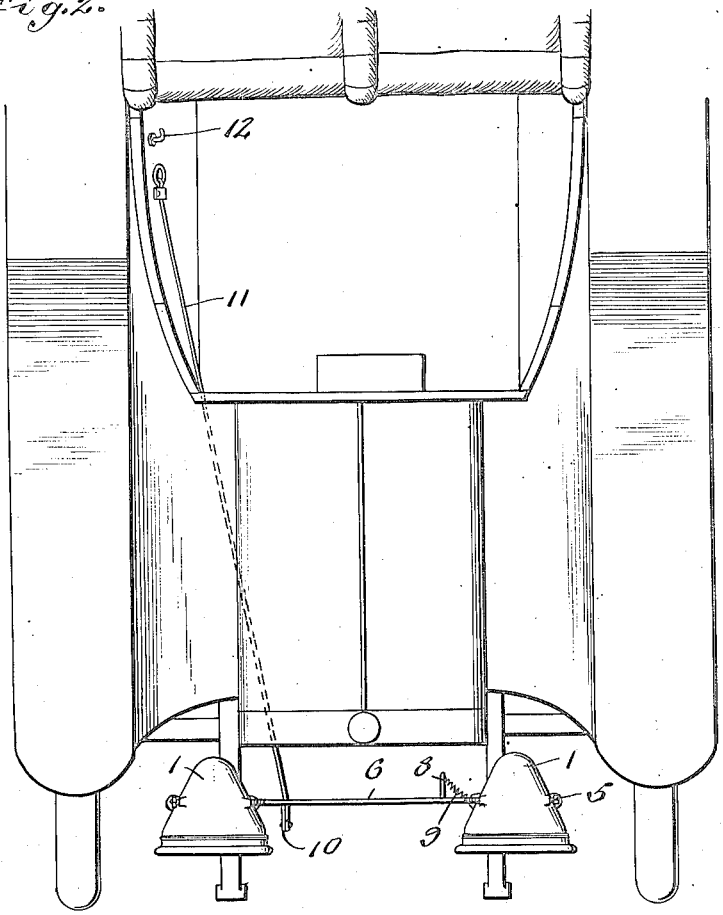
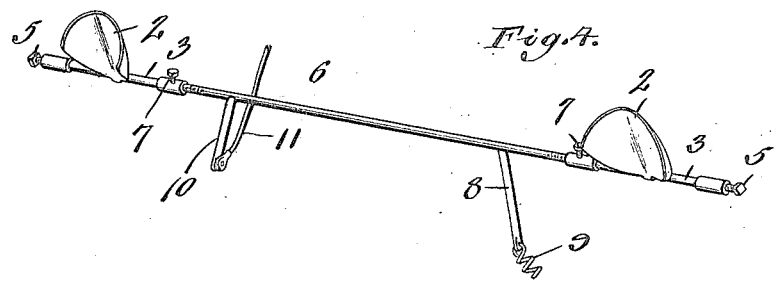

UNITED STATES PATENT OFFICE.

CHARLIE BROWN, OF GLENCOE, ILLINOIS.

HEADLIGHT.

1,110,877.

Specification of Letters Patent. Patented Sept. 15, 1914.

Application filed November 29, 1913. Serial No. 803,326.

*To all whom it may concern:*

Be it known that I, CHARLIE BROWN, a citizen of the United States, residing at Glencoe, in the county of Cook and State of Illinois, have invented new and useful Improvements in Headlights, of which the following is a specification.

Motor vehicles of the automobile type are universally provided with searchlights for use upon dark roads and thoroughfares for lighting the same to prevent a fatality. It frequently becomes desirable to modify or restrict the field of illumination so as to prevent the blinding of pedestrians, operators and drivers of approaching vehicles and animals of horse drawn vehicles.

The invention relates to means for restricting the beams of light, thereby preventing annoyance to drivers of approaching vehicles, said means being under control of the operator and easy to manipulate and certain and positive in action.

The invention consists of a deflector or shade pivotally mounted within the reflector so as to be turned to cover more or less of the light when it is required to restrict the field of illumination or to be turned aside to admit of the full capacity of the light being obtained for a maximum illumination of the roadway to be lighted.

The invention consists of the novel features, details of construction and combination of parts, which hereinafter will be more particularly set forth, illustrated in the accompanying drawing, and pointed out in the appended claims.

Figure 1:
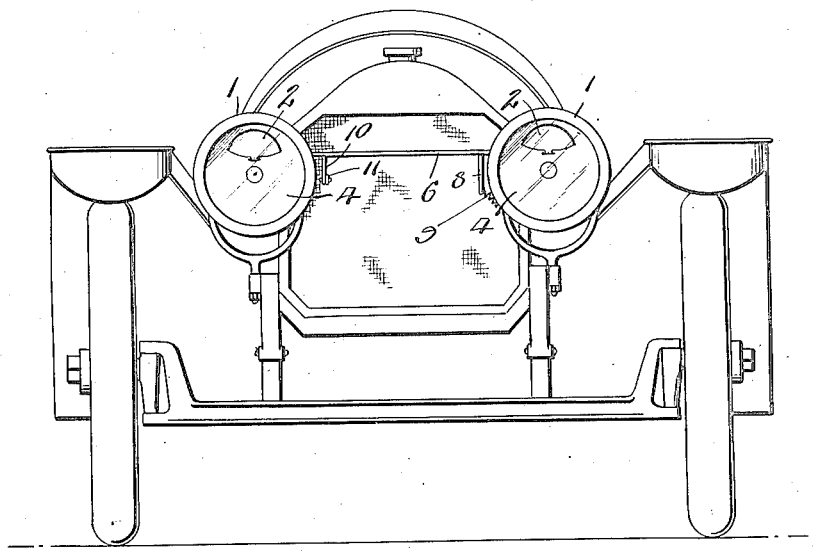
Figure 3:
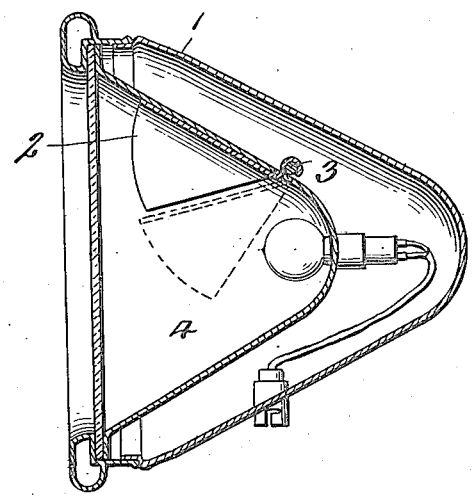

Referring to the drawing forming a part of the specification, Figure 1 is a front view of an automobile provided with headlamps embodying the invention. Fig. 2 is a top plan view. Fig. 3 is an enlarged sectional view of one of the lamps, the full and dotted lines showing different positions of the deflector or shade. Fig. 4 is a detail view of the deflector and mountings therefor.

Corresponding and like parts are referred to in the following description, and indicated in all the views of the drawing, by the same reference characters.

Inasmuch as the invention is chiefly designed for the headlamps of automobiles it is shown in this connection in the drawings hereto attached, the headlamps 1 being of ordinary construction and arrangement and using any type of lamp. A deflector or shade 2 is arranged within each of the lamps so as to control the rays of light and restrict the field of illumination. As indicated in the drawings the deflector 2 is arranged within the reflector of the lamp and above the light, thereby enabling the rays to be thrown downward or cut off so as to prevent blinding the driver of an approaching vehicle. The deflector or shade 2 is transversely curved and pivotally mounted at its inner end at a point above the light to admit of its front end being thrown up or down with the result that the upper illuminating field of the projected beams of light may be restricted and controlled. The under surface of the deflector or shade may be highly polished to provide a reflecting surface for throwing the beams of light forward when such deflector is turned upward. The deflector is shaped in a manner approximate that portion of the reflector of the lamp immediately in the rear of the deflector when the latter is thrown upward so that the maximum illuminating capacity of the lamp may be had when required. A rod 3 extends transversely through the rear portion of the lamp body in the rear of the reflector 4 and has the deflector 2 secured thereto in any manner so as to turn therewith. The ends of the rod 3 obtain bearings in the sides of the lamp body and are preferably enlarged and formed with internally threaded sockets. A cap screw 5 is threaded into the outer socket of the rod 3 and serves as means to prevent inward movement of the rod. A connecting rod 6 has its terminal portions threaded to the sockets at the inner ends of the rods 3. The screw threads upon one end of the connecting rod 6 are right hand and the screw threads upon the opposite end of such rod are left hand, hence turning of the rod 6 moves the rods 3 in opposite directions.

It is to be understood that the connecting rod 6 may be made secure when the parts are properly assembled and for this purpose set screws 7 are threaded into openings formed in the inner sockets of the rod 3 in such a manner as to admit of their inner ends engaging the threaded ends of the rod 6. When the parts are properly assembled the deflectors 2 of both headlamps move in unison.

It is to be understood that any suitable means may be provided for turning the connecting rod 6 to admit of throwing the outer end of the deflector 2 up or down. An arm 8 is secured at one end to the connecting rod 6 and a contractile spring 9 of helical form connects the outer end of the arm 8 with a convenient part of the machine or lamp support. This spring 9 normally holds the deflector elevated. A second arm 10 is secured to the rod 6 and an operating cord or like part 11 is attached to the outer end of such arm and extends within convenient reach of the deflector so as to be pulled upon when flector to restrict the field of illumination port. This spring 9 normally holds the deflector to prevent the blinding of the driver of an approaching vehicle, or a pedestrian, or animal of a horse drawn vehicle. The inner end of the operating cord 11 when drawn upon may be secured in any manner and is usually provided with a ring to engage a stop 12.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claims appended hereto.

Having thus described the invention what is claimed as new is;—

1. A headlamp of the character specified comprising a reflector, a rod located in the rear of the reflector and supported in the lamp body, means for turning such rod, and a deflector or shade arranged within the reflector above the light and having connection as its rear end with the before mentioned rod through an opening formed in the reflector, said deflector conforming approximately to the shape of the reflector when thrown upward to admit of the maximum illuminating capacity of the light.

2. In combination, side headlamps provided with a reflector, a rod mounted in the lamp body in the rear of the reflector and having internally threaded sockets at its ends, a deflector arranged within the reflector of each lamp and connected at its inner end with the rod, cap screws threaded to the outer sockets of the rods, a connecting rod threaded to the inner sockets of the lamp rods, two arms secured to said connecting rod, a spring connecting one of such arms to a part of the machine or lamp support, and an operating cord or like part attached to the other arm and extending within convenient reach of the driver.

In testimony whereof I affix my signature in presence of two witnesses.

CHARLIE BROWN.

Witnesses:
　E. D. BRIGHAM, Jr.,
　JOS. M. SCHINLER.